United States Patent
Takahashi et al.

(10) Patent No.: US 8,104,557 B2
(45) Date of Patent: Jan. 31, 2012

(54) LINEAR DRIVE TRAVEL SYSTEM AND AUTOMOBILE

(76) Inventors: Sachio Takahashi, Morioka (JP); Kazuo Fuda, Morioka (JP)

( * ) Notice: Subject to any disclaimer, the term of this patent is extended or adjusted under 35 U.S.C. 154(b) by 706 days.

(21) Appl. No.: 12/224,890

(22) PCT Filed: Mar. 12, 2007

(86) PCT No.: PCT/JP2007/054764
§ 371 (c)(1),
(2), (4) Date: Sep. 9, 2008

(87) PCT Pub. No.: WO2007/119327
PCT Pub. Date: Oct. 25, 2007

(65) Prior Publication Data
US 2009/0066173 A1   Mar. 12, 2009

(30) Foreign Application Priority Data
Mar. 15, 2006 (JP) .................................. 2006-070565

(51) Int. Cl.
*B60K 1/00* (2006.01)
*B60L 8/00* (2006.01)
(52) U.S. Cl. ..................................... 180/65.51; 180/2.2
(58) Field of Classification Search .................... 180/2.2, 180/65.1, 65.31, 65.51; 310/103, 112, 166, 310/49.51
See application file for complete search history.

(56) References Cited

U.S. PATENT DOCUMENTS

| | | | | | |
|---|---|---|---|---|---|
| 4,888,533 | A | * | 12/1989 | Gotoh et al. | 318/524 |
| 4,961,042 | A | * | 10/1990 | Imaseki | 318/758 |
| 5,289,072 | A | * | 2/1994 | Lange | 310/266 |
| 5,936,325 | A | * | 8/1999 | Permuy | 310/162 |

FOREIGN PATENT DOCUMENTS

| | | |
|---|---|---|
| JP | S60-81027 U | 6/1985 |
| JP | H04-87830 A | 3/1992 |
| JP | H07-101252 A | 4/1995 |
| JP | H10-305735 A | 11/1998 |
| JP | 2002-281722 A | 9/2002 |
| JP | 2004-343905 A | 12/2004 |
| JP | 2006-341626 A | 12/2006 |

* cited by examiner

*Primary Examiner* — Frank Vanaman
(74) *Attorney, Agent, or Firm* — Manabu Kanesaka

(57) ABSTRACT

To enable control the number of revolutions of a wheel with a new structure different from an induction motor and adjust the maximum torque rapidly and accurately.
A linear drive travel system includes a metal wheel 20 having a drum rotor and a stator 30 arranged inside the metal wheel 20. The stator 30 includes a plurality of rows of electromagnets 32 arranged in the direction of rotation axis, each row being formed of a plurality of electromagnets 32 arranged along the circumference around a rotary shaft 40. A drum rotor includes a plurality of arc-shaped rotor cores 23 arranged along the circumference around the rotary shaft 40. Control means (control system 80) performs control by allowing electromagnets 32 in some rows to be a magnetization coil of the rotor core and by allowing the electromagnets 32 in other rows to be a rotation coil of the drum motor.

6 Claims, 13 Drawing Sheets

LINEAR DRIVE TRAVEL SYSTEM AND AUTOMOBILE

TECHNICAL FIELD

The invention relates to a linear drive travel system having a wheel-driven motor inside the metal wheel of a wheel and an automobile provided with such a linear drive travel system. In particular, the invention relates to a linear drive travel system provided with a plurality of stators, which enables the driving torque of a drum rotor to have a maximum torque and facilitates the torque adjustment.

BACKGROUND

Conventionally, engines have been used as the sole power source of an automobile. In recent years, a metal wheel motor has attracted attention as an automobile's power source, replacing the engine.

The metal wheel motor has benefits including high power transmission and highly responsive control, which can be conducted independently for each wheel.

In addition, installation of a metal wheel motor on each of the four wheels eliminates the conventional, complicated driving system (transmission, drive shaft, differential gear, and the like), enhancing the degree of freedom in under-floor layout.

Since recently, various proposals have been made for metal wheel motors having the various advantages mentioned above.

For example, an outer rotor-type metal wheel motor is known which comprises a disc metal wheel having a rim part, a disc part and a motor stator fixed to a hub-supporting part, in which at least one of the rim part and the disc part constitutes a motor rotor and the motor rotor has the same structure as an induction motor (see Patent Document 1, for example).

As an example of other structures, a switched reluctance motor is known which comprises a motor rotor provided with a plurality of rotor poles fastened to the inner periphery of the rim part, projected in the direction of a supporting shaft, and are arranged along the circumference, and a motor stator provided with a plurality of stator poles fastened to the supporting shaft, projected in the direction away from the supporting shaft and are arranged along the circumference (see Patent Document 2, for example).

As yet another example of other structures, a high-rotary speed, electrically-driven wheel is known which comprises several electromagnets arranged on the non-rotating part of a wheel in plural circular rows integrally or circumferentially, and a rotary shaft formed of a non-magnetic material on which a plurality of magnets are provided on one or both sides of the electromagnets at a position opposite to the electromagnets in such a manner that the magnets are arranged at an equal interval along the circumference and are nearly in contact with the electromagnets with a small slit therebetween, wherein the magnetic polarity and position of the rotating magnets are detected by a magnetic sensor. A semiconductor for switching electrical current is actuated to switch the positive and the negative electrical currents to change the polarity of the electromagnets, thereby causing driving power to generate. The discontinuation period of the electrical current and the amount of electric power are controlled, whereby the control of the rotation speed of the wheel is realized (see Patent Document 3, for example).

These are outer rotor type metal wheel motors in which a motor rotor is provided on the outside of the motor stator.

In such outer rotor type metal wheel motors, output and torque can be increased easily. Furthermore, a loss in driving power can be reduced since a reduction gear is not necessary, and an increase in unsprung weight can be suppressed. In addition, due to the elimination of a reduction gear, a motor is easily installed in a metal wheel house. Furthermore, due to the hollow inside structure, it is possible to accommodate other components such as a brake.

In addition, due to these structural advantages, a motor can be provided to front wheels having a steering mechanism, realizing a four-wheel metal wheel motor automobile.

Patent Document 1: JP-A-10-305735
Patent Document 2: JP-A-2004-343905
Patent Document 3: JP-A-07-101252

SUMMARY OF THE INVENTION

Problem to be Solved by the Invention

During the driving of an automobile, it is required to control the number of revolutions of a wheel. Since the metal wheel motor disclosed in Patent Document 1 is constructed as an induction motor, it is extremely difficult to control the number of revolutions. Conventionally, inductions motors have been used mainly in equipment operated at a predetermined number of revolutions, and the induction motors are considered to be not suited to equipment requiring the control of the number of revolutions.

This is because of difficulty in controlling the number of revolutions of an induction motor.

An induction motor is a motor in which a rotating magnetic field is electrically created by utilizing an alternating voltage, and a rotator is caused to rotate in a synchronized manner. In this case, changing the value of the alternating voltage is considered to be effective to control the number of revolutions of a motor.

Specific examples include insertion of a drag to utilize a drop in the voltage thereof and performing a switching control (i.e. phase control).

However, the former method is not practical since a loss is too large. The latter method is also not practical, due to poor responsiveness.

As mentioned above, since the induction motors are not suited to the equipment requiring the control of the number of revolutions, it goes without saying that it is not proper to use a metal wheel motor in an induction motor.

In the metal wheel motor disclosed in Patent Document 2, the rotor pole and the stator pole each have two U-shaped rotor core bodies, and the U-shaped rotor core in the rotor pole and the U-shaped rotor core in the stator pole are opposed (e.g. like "⊂ ⊃") to form two O-shaped (circular) magnetic paths. In this constitution, it should be noted that the two rotor core bodies in one stator pole share the magnetic field generated by a single coil, and that two electromagnets are not formed. Therefore, it is impossible to allow different magnetic fields to be generated for each rotor core body, and hence, the torque control for rotor revolution has its limit.

The metal wheel motor disclosed in Patent Document 3 has electromagnets being distributed along a plurality of circumferences in the radial direction around the rotary shaft. The driving principle of this metal wheel motor is similar to that of the induction motor. Accordingly, the metal wheel motor encounters the same problem as the metal wheel motor disclosed in Patent Document 1.

In addition, a motor obtained by using a permanent magnet in a rotor, which is generally called a PM motor, has been proposed (JP-A-2002-281722, for example). However, this motor has a complicated structure since it requires a sealing construction to prevent adsorption of iron sand or scrap iron.

The invention has been made in view of the above-mentioned problems, and the object thereof is to provide a linear drive travel system and an automobile which realize the control of the number of revolutions by a new structure which is different from an induction motor and is capable of adjusting a maximum torque quickly and accurately with a simple structure which does not utilize a permanent magnet.

Means for Solving the Problem

In order to achieve this object, the linear drive travel system of the invention comprises a metal wheel having a drum rotor and a stator arranged inside the metal wheel, wherein the metal wheel has a rotary shaft as the axis of rotation of the metal wheel, and the stator has a plurality of rows of electromagnets arranged in the direction of the axis of rotation, each row being formed by a plurality of electromagnets arranged along the circumference around the rotary shaft.

Due to such a configuration, a linear drive travel system provided with a plurality of stators can be realized since electromagnets are arranged in a plurality of rows in the direction of the rotary shaft.

In addition, for each electromagnet, different electrical current control can be performed for each row. For example, an electromagnet in one row is used for the magnetization of a rotor, and an electromagnet in other rows is used for the rotational control of the magnetized rotor. By controlling adequately the electromagnet for magnetization and the electromagnet for rotational control, the maximum torque can be adjusted rapidly and accurately by a simple structure without using permanent magnets.

The linear drive travel system of the invention has such a configuration in which the drum rotor has a plurality of arc-shaped rotor cores arranged along the circumference around the rotary shaft, and a slit is provided between these rotor cores.

By allowing the linear drive travel system to have such a configuration, the linear drive travel system can have a simple structure without using a permanent magnet in the rotor. In addition, the rotor core is magnetized by the electromagnet for magnetization and the drum rotor is rotated by utilizing repulsion or attraction with the electromagnet for rotational control.

The linear drive travel system of the invention comprises a control means for controlling electrical current flowing to the electromagnet, in which, of the electromagnets in a plurality of rows, the control means controls electromagnets in some rows as a magnetization coil for magnetizing the rotor core and controls electromagnets in other one or two or more rows as a rotation coil for rotating the drum rotor.

By allowing the linear drive travel system to have such a configuration, it is possible to rotate a drum rotor by magnetizing and rotationally controlling the rotor core to allow the drum rotor to rotate in a structure which does not use a permanent magnet in the rotor. As a result, it is possible to control the number of revolutions of a wheel with a new structure which is different from an induction motor.

In addition, by performing adequate electrical current control for both the magnetization coil and the rotation coil, the maximum torque can be adjusted quickly and accurately.

The linear drive travel system of the invention may have a configuration wherein, for the electromagnets in one row to be controlled as a magnetization coil, the control means performs the following control in a switching manner, flowing electrical current to adjacent electromagnets in opposing directions to generate a U-shaped magnetic field to allow one electromagnet to be the N pole and the other electromagnet to be the S pole; and flowing electrical current to every other electromagnet of the plurality of electromagnets.

Due to such a configuration of the linear drive travel system, adequate magnetization of the rotor core can be realized according to the driving condition of an automobile. For example, when the automobile starts to move, a U-shaped magnetic field is generated to magnetize the rotor core. During the driving of the automobile, electrical current is flown to every other electromagnet since a large amount of torque is not required. By performing such control, an adequate amount of torque can be generated according to the driving conditions of the automobile, thereby avoiding wasteful electric current consumption.

In addition, if electrical current is flown to every other electromagnet, any electromagnet to which electrical current is not flown, can generate power as a power generator by using a counter electromotive power generation action during the braking operation. This power can be utilized for battery charging.

In the linear drive travel system of the invention, for a plurality of electromagnets in one row to be controlled as a rotation coil, the control means performs the following control in a switching manner with the plurality of electromagnets being divided into a plurality of groups, for each group, flowing electrical current to one electromagnet with other electromagnets being left as they are, for each group, flowing electrical current to a plurality of electromagnets with other electromagnets being left as they are, and flowing electrical current to all of the electromagnets.

Due to such a configuration of the linear drive travel system, an adequate torque can be generated according to the driving conditions of an automobile. Specifically, when an automobile starts to move, electrical current is flown to all of the electromagnets. During the driving of the automobile, electrical current is flown to one of electromagnets in each group. By performing such a control, a torque can be generated according to the driving condition of an automobile, thereby eliminating wasteful electrical current consumption.

In addition, by adequately controlling both the electrical current to be flown to the magnetization coil and the electrical current to be flown to the rotation coil, the maximum torque can be adjusted quickly and accurately.

Furthermore, the linear drive travel system of the invention may have a configuration which comprises:

an acceleration device to be operated by a driver, an operation amount detecting means which detects the operation amount of the acceleration device, a pulse generator which creates and generates a pulse signal having a frequency corresponding to the driving amount upon receipt of a detection signal from the driving amount detecting means, and a driving signal outputting means which creates and outputs a signal for driving the electromagnet based on the pulse signal from the pulse generator, wherein the control means controls electrical current to be flown to the plurality of electromagnets based on the driving signal.

If the linear drive travel system has such a configuration, when the operation amount of the acceleration device (the amount of change) is large, the frequency of a pulse signal can be decreased and the rotation speed can be increased by increasing the induction switching operation of the rotation coil. If the operation amount of the acceleration device is small, the rotation speed can be decreased by reducing the frequency of the pulse signal and by decreasing the induction switching operation. As mentioned earlier, the number of revolutions of the wheel can be adequately controlled according to the operation amount of the acceleration device.

Furthermore, the linear drive travel system of the invention may have such a configuration which comprises a stator base having the electromagnets being attached to the outer periphery thereof and a through hole for passing the rotary shaft therethrough, a plurality of bearings which are engaged in the through hole of the stator base and a plurality of bearings having an inner ring through which the rotary shaft passes through, and a rotary sensor provided between two bearings of these plurality of bearings.

Due to such a configuration of the linear drive travel system, a rotary sensor may be provided between two bearings.

Furthermore, the automobile of the invention comprises a plurality of wheels, wherein the linear drive travel system of the invention is mounted on one or two or more of the wheels of the automobile.

Due to such a configuration of the automobile, the maximum torque can be adjusted quickly and accurately in the linear drive travel system mounted on the wheel.

Furthermore, the automobile of the invention comprises an air conditioner for supplying heated or cooled air to the automobile, wherein the air conditioner has a vent hole which is provided in an exposed way within the automobile and discharges air inside the automobile, a fan which is provided inside the vent hole and sends the air from the vent hole to the inside of the automobile, and a peltier device which heats or cools the air sent by the fan.

Due to such a configuration of the automobile, air is heated or cooled by a peltier device, and the heated or cooled air can be sent to the inside of the automobile.

Advantageous Effects of the Invention

As mentioned above, according to the invention, since the linear drive travel system has a configuration in which a plurality of stators are provided, the maximum torque can be adjusted quickly and accurately by causing a rotational magnetic field to be generated by controlling some of the stators as a magnetization coil and by controlling the remaining stators as a rotation coil.

As for the rotor cores, since a plurality of arc-shaped sheet members are put one on another in a ring-like shape to form the rotor cores, a simple structure can be realized without using a permanent magnet.

EXPLANATION OF NUMERALS

Figure 1:
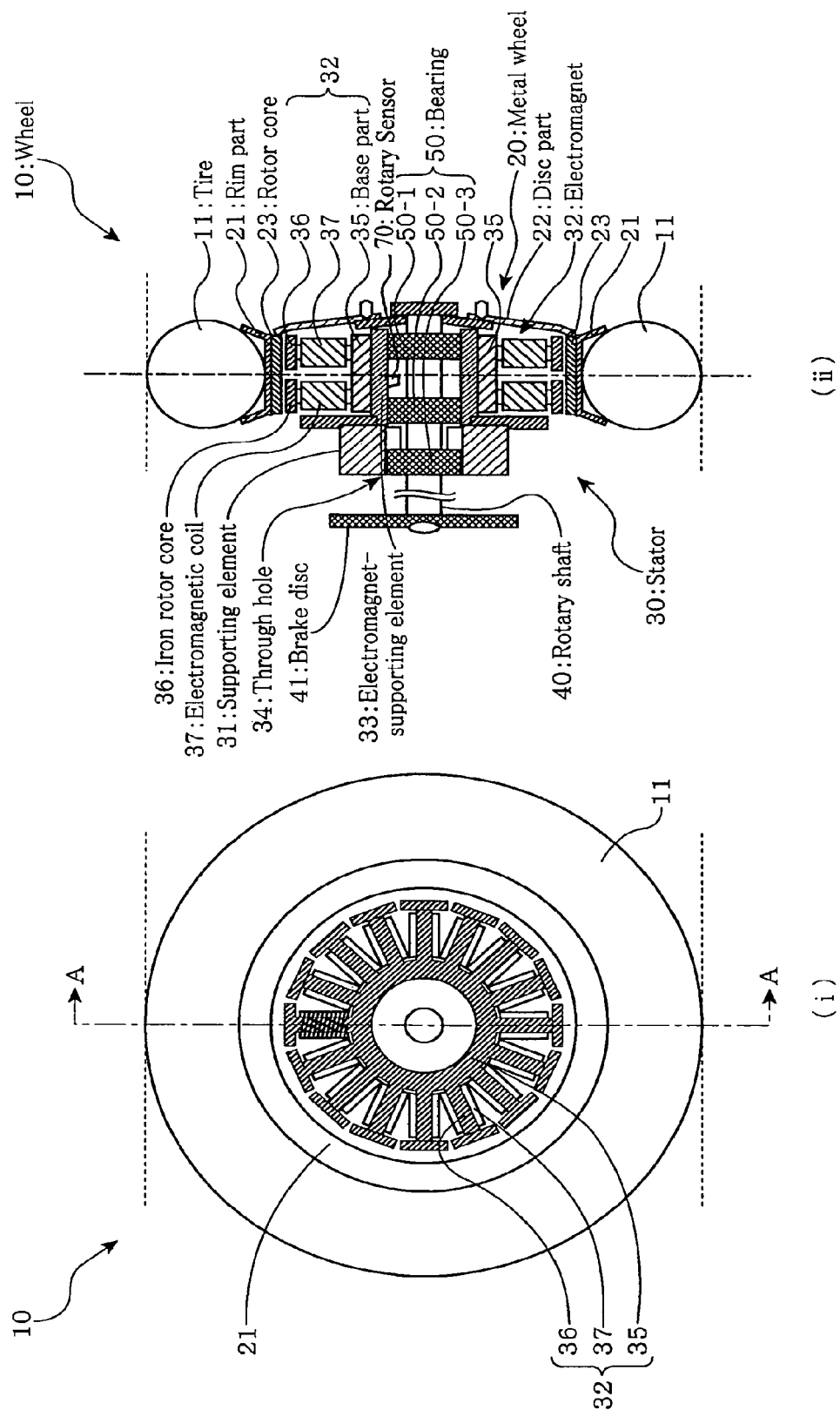
FIG. 1 shows the structure of the wheel part of the automobile of the invention, in which (i) is a plan view of the wheel as viewed from the side, (in which the disc part of the metal wheel is removed); and (ii) is a cross-sectional view of the wheel as viewed from the front (or from the back), taken along line A-A in FIG. 1(i)

1. Automobile
10. Wheel
20. Metal wheel
23. Rotor core
30. Stator
32. Electromagnet
33. Electromagnet-supporting element
34. Through hole
35. Base part
36. Core
37. Electromagnetic coil
40. Rotary shaft
50. Bearing
80. Control system
81. Power source control system
82. Battery
83. Linear power-generating DC stabilizer
84. Travel device
85. Linear travel control system
85-1. Pulse inverter (pulse generator)
86. Computer control system 96. Accelerating device
97. Operation amount detecting means
103 (103a, 103b). Side vent hole
104. Unit dome
105. Fan
106. Peltier device
108 (108a, 108b). Door vent hole

BEST MODE FOR CARRYING OUT THE
INVENTION

The preferred embodiment of the linear drive travel system and the automobile of the invention will be described with reference to the drawings.
[Linear Drive Travel System (Structure of a Wheel)]
The embodiment of the linear drive travel system of the invention is explained with reference to FIGS. 1(i) and (ii).

FIGS. 1(i) and (ii) show the structure of a wheel part of the automobile of this embodiment, in which (i) is a plan view of a wheel as viewed from the side (the state in which the disc part of a metal wheel is removed), and (ii) is a cross-sectional view of a wheel when viewed from the front (or the back) of the automobile (taken along line A-A in FIG. 1(i)).

As shown in FIGS. 1(i) and (ii), the wheel 10 comprises an approximately doughnut-shaped tire 11, a metal wheel 20 which is shaped almost cylindrically, has the tire 11 being attached on the outer circumference thereof and partially or entirely constitutes a drum rotor (coupling part) of the linear drive travel system, a stator 30 provided inside the metal wheel 20, the rotary shaft 40 which serves as the central axis of the wheel 20, and bearings 50 (50-1~50-3) provided between the rotary shaft 40 and the stator 30.

As shown in FIG. 1 (ii), the metal wheel 20 has a rim part 21 which is shaped almost cylindrically and supports the tire 11 from the inside of the inner ring of the doughnut-shaped structure, a disc part 22 which is formed in a disc-like shape and supports the rim part 21 from its inner side surface, and a plurality of rotor cores (drum rotor core) 23 (23-1~23-n) arranged circularly along the inner side surface of the rim part 21.

Figure 2:
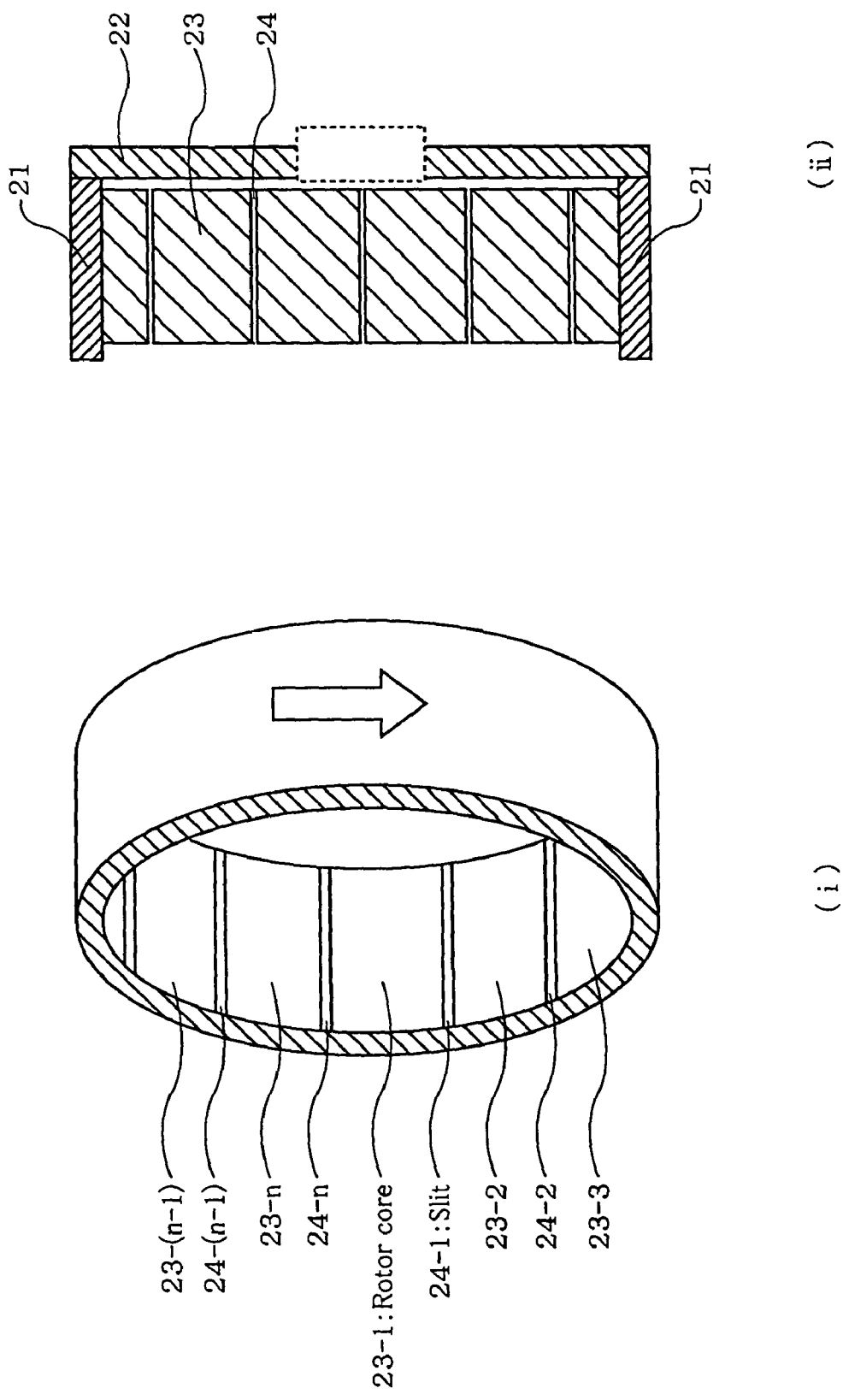
FIG. 2 is a perspective view of the appearance of the rotor cores combined in a ring form.

A single piece of rotor core 23 is an arc-shaped plate element. When a plurality of rotor cores are arranged one over another, a ring-shaped body shown in FIG. 2(i) is formed. These ring-shaped bodies are arranged on the inner side surface of the rim part 21.

In FIGS. 2(i) and (ii), the ring-shaped body is obtained by arranging a plurality of rotor cores 23 in a single row, but the rotor cores 23 are not limited to be arranged in a single row. For example, it is possible to form the ring-shaped body by arranging the rotor cores 23 in a plurality of rows.

The wheel 10 rotates when the rotor core 23 is magnetized by an electromagnet 32 (mentioned later), creating torque. Therefore, the rotor core 23 has a function as a drum rotor.

Between the plurality of rotor cores 23 constituting the ring-shaped body, slits 24 (24-1~24-n) are provided. These slits have the same width.

The rotor core 23 can be integrally formed with the rim part 21 of the metal wheel 20. That is, part or all of the rim part 21 can be formed as the rotor core 23. In addition, the rotor core 23 is produced separately from the rim part 21, and may have such a configuration in which the rotor core 23 is attached to the inner side surface of the rim part 21. Furthermore, the rotor core 23 may be provided in contact with the rim part 21, or may be provided apart from the rim part 21.

The stator 30 is the driving part of the linear drive travel system. As shown in FIGS. 1(i) and (ii), the stator 30 has a supporting element 31 and a plurality of electromagnets 32 (32-11~32-mn).

The supporting element (stator substrate) 31 is fixed to an automobile body 50 (chasis), and supports the electromagnets 32. In particular, of the supporting element 31, the part which is formed in a cylindrical shape, with the electromagnets 32 being attached to the outer periphery thereof, is called an electromagnet-supporting element (cylindrical element) 33.

In this supporting element 31, a through hole 34 is bored, which communicates with the cylindrical hollow portion of the electromagnet-supporting element 33. The through hole 34 is engaged with a bearing 50. The outer periphery of the outer ring of this bearing 50 is in contact with the side surface of the through hole 34.

The electromagnet 32 comprises a base part 35, a core 36 and an electromagnetic coil 37.

The base part 35 is formed in a cylindrical shape and positioned along the circumference around the rotary shaft 40.

Furthermore, the base part 35 is positioned outside the electromagnet-supporting element 33 of the supporting member 31. This base part 35 may be provided in contact with the outer periphery of the electromagnet-supporting member 33, or may be provided apart from the outer periphery of the electromagnet-supporting member 33.

A core 36 is a magnetic pole element which is in a cylindrical (or prismatic) shape and extends from the base 35 outwardly in the radial direction of the rotary shaft 40. Generally, one core 36 is provided for each electromagnet 32. It should be noted that the core (rotor core) may have a structure similar to that of the core disclosed in JP-2004-343905.

The base part 35 and the core 36 may be formed, for example, by using a directional silicon steel plate.

The electromagnetic coil 37 is a coil wound around the core 36. The electrical current flown in the electromagnetic coil 37 is controlled by a computer. Specific examples of the electrical current control are described in "Control of Electromagnet Coil", which is given later.

As shown in FIGS. 1(i) and (ii), a plurality of electromagnets 32 (a pair of the core 36 and the electromagnetic coil 37) are arranged along the circumference around the rotary shaft 40. At the same time, a plurality of rows each comprising a plurality of electromagnets are arranged in the axial direction of the rotary shaft 40. Specifically, the electromagnets 32 are arranged as follows. A single row, which comprises a plurality of electromagnets 32 (16 electromagnets in FIG. 1(i)), is arranged along the outer periphery of the bench part 35 which is provided outside the electromagnet-supporting element 33. Furthermore, these electromagnets 32 are arranged in a plurality of rows (two rows in FIG. 1(ii)).

The number of electromagnets 32 may be the same in each row. In addition, in a single row, a plurality of electromagnets 32 is arranged at an equal interval. Therefore, when the wheel 10 is viewed from the front (the direction shown in FIG. 1(i)), each of the electromagnets 32 in the front side and each of the electromagnets 32 in the rear side is arranged at the same position.

Figure 3:
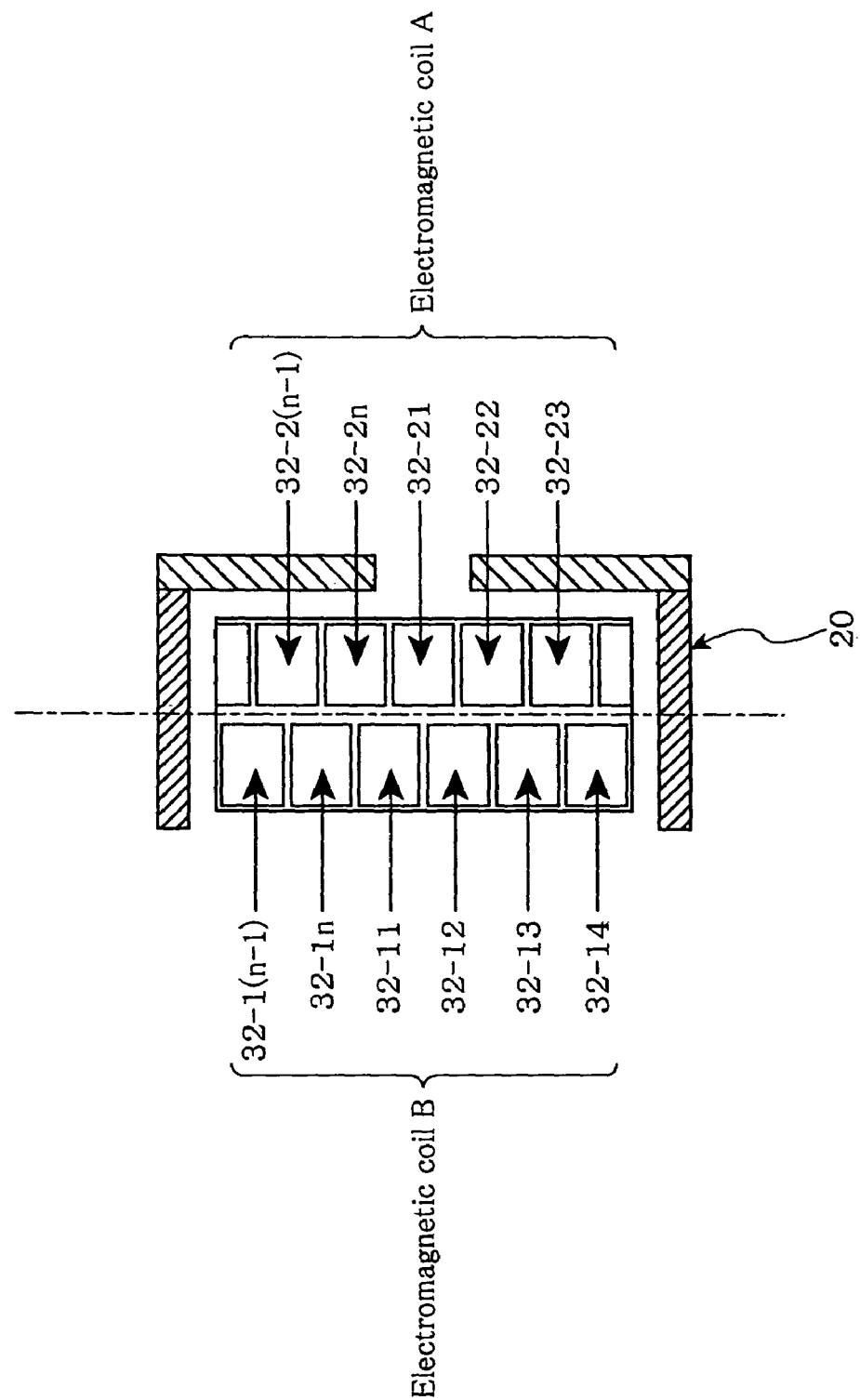
FIG. 3 is a view showing the arrangement of electromagnets in each row.

In this embodiment, however, as shown in FIG. 3, for each of the electromagnets 32 arranged in the front-side row, each of the electromagnets 32 in the rear-side row is slightly staggered in the rotational direction of the metal wheel 20. As a result, adjustment is realized so that the maximum torque is generated.

Figure 16:
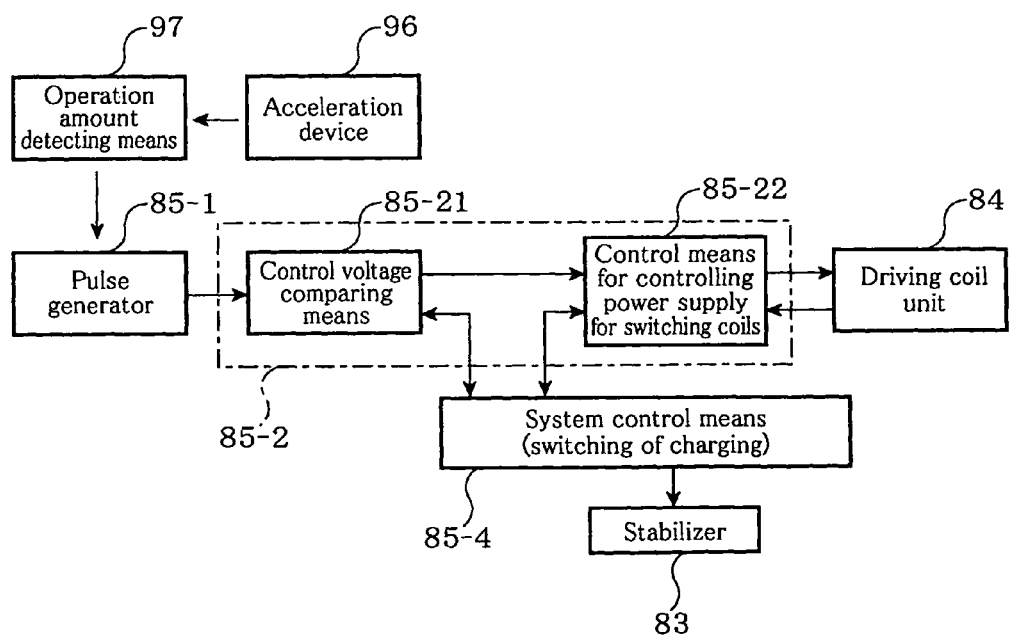
FIG. 16 is a block diagram showing the structure of a control system which is associated with the rotational control of a wheel.

In FIG. 1(i), 16 electromagnets are arranged in a single row, but the number of the electromagnets is not limited to 16, and an arbitrary number of electromagnets can be arranged.

Furthermore, in FIG. 1(ii), two rows of electromagnets 32, each row comprising 16 electromagnets, are arranged. The number of rows is not limited to two, and can be three or more.

One end of a rotary shaft 40 is connected to a hub hole (center bore) of the metal wheel 20, and the other end thereof is connected with a brake disc 41 which controls the rotation of the metal-wheel 20. The metal wheel 20 rotates around the rotary shaft 40.

As for the bearing 50, the outer ring thereof is fastened in such a manner that it is engaged with the through hole 34 of the supporting element 31. Similarly, the rotary shaft 40 is passed through the inter ring of the bearing 50. Due to the presence of the bearing 50, the metal wheel 20 can be rotated with the supporting element 31 being fastened to the automobile body 50.

In this embodiment, three bearings 50 are provided. Due to the provision of three bearings, a sensor (rotary sensor 70) which detects the number of revolutions of the metal wheel 20 can be accommodated inside the through hole 34 of the supporting element 31 and between the two bearings 50.

In this embodiment, three bearings 50 are provided. The number of the bearing is not limited to three. For example, the number of the bearings may be two or four or more.

The rotation sensor may be a sensor which can detect a numeral value which is associated with the rotation of the metal wheel 20 or of the rotary shaft 40. For example, the rotary sensor 70 includes a sensor which detects the number of revolutions or the rotation speed of the metal wheel 20 or the like.

As mentioned hereinabove, the wheel 10 is provided with the drum rotor (rotor core 23) and the stator 30, and the linear drive travel system is constructed by incorporating a control system 80, mentioned later.

The wheel 10 as mentioned above can be installed in conventional automobiles. In this case, one or all of the plurality of the wheels of the automobile may be composed of the wheel 10 of this embodiment.

[Electrical Current Control of Electromagnet]

Next, the electrical current control of the electromagnet is explained with reference to FIGS. 4 and 5.

Figure 4:
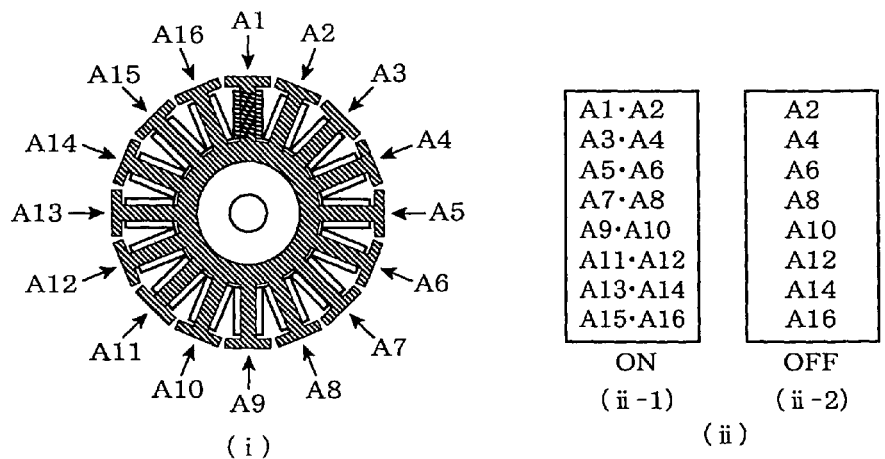
FIG. 4 is an explanatory view for the control of the electromagnet coil A, in which (i) is a side view showing the arrangement of the electromagnet coil A and (ii) is a control pattern showing an example of the electrical current control of the electromagnet coil A.
Figure 5:
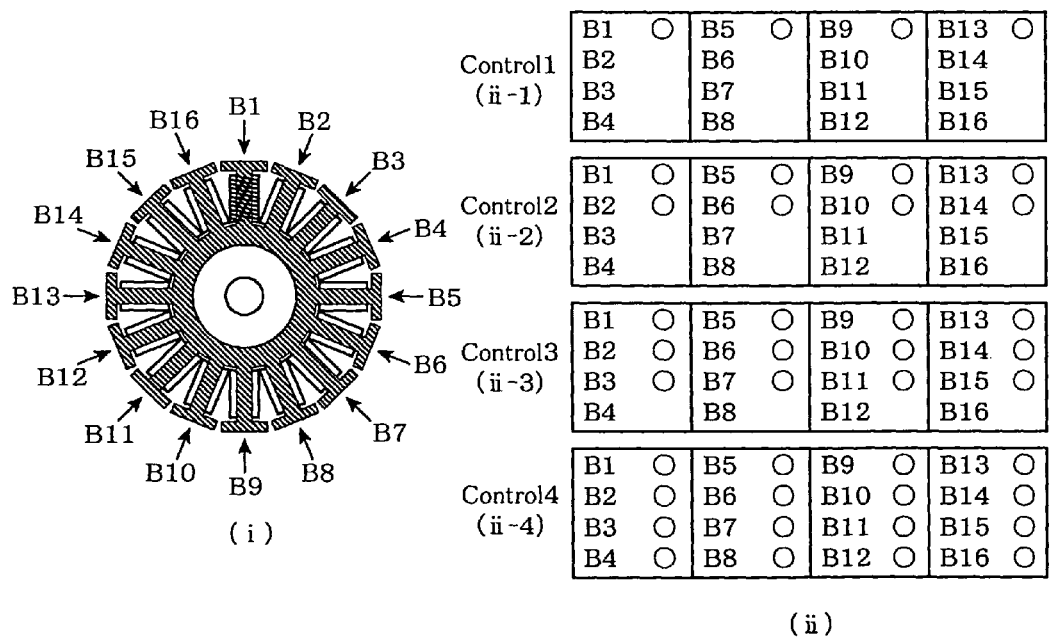
FIG. 5 is an explanatory view for the control of the electromagnet coil B, in which (i) is a side view showing the arrangement of the electromagnet coil B and (ii) is a control pattern showing an example of the electrical current control of the electromagnet coil B.

FIG. 4 is an explanatory view for the control of the electromagnetic coil A, and FIG. 5 is an explanatory view for the control of the electromagnetic coil B. Furthermore, FIG. 4(i) is a side view showing the arrangement of the electromagnetic coil A, and FIG. 4(ii) is a control pattern showing an example of the electrical current control of the electromagnetic coil A. Furthermore, FIG. 5(i) is a side view showing the arrangement of the electromagnetic coil B, and FIG. 5(ii) is a control pattern showing an example of the electrical current control of the electromagnetic coil B.

As shown in FIG. 3, each of the electromagnetic coils of the plurality of electromagnets 32 constituting one row (front-side row) is the electromagnetic coil A, and each of the electromagnetic coils of the plurality of electromagnets 32 constituting another row (rear-side row) is the electromagnetic coil B. At this time, the electromagnetic coil A may be an induction electromagnetic coil (magnetization coil) which magnetizes the rotor core 23 by induction (magnetization coil) and the electromagnetic coil B may be a coil which induces torque by driving magnetism (coil for torque drive, coil for rotation). As mentioned above, the wheel 10 of this embodiment has two stators of the induction electromagnetic coil and the torque induction coil.

Next, the electrical current control of these two stators is explained below.
(Control of Electromagnetic Coil A)

As shown in FIG. 4(i), the electromagnetic coil A (induction electromagnetic coil A) comprises 16 electromagnetic coils A1 to A16.

As shown in FIG. 4(ii), electrical current is flown to the electromagnetic coil A in two patterns, i.e. the first pattern (ii-1) and the second pattern (ii-2).

(1) First Pattern

In the first pattern, electrical current is flown (turn on) to two adjacent electromagnetic coils as a group. Specifically, as shown in FIG. 4(ii-1), "A1 and A2", "A3 and A4", "A5 and A6", "A7 and A8", "A9 and A10", "A11 and A12", "A13 and A14" and "A15 and A16" respectively constitute one group, and electrical current is flown to each group.

Here, electrical current is flown in opposing directions to the two electromagnetic coils constituting each group. For example, in "A1 and A2", electrical current is flown to the electromagnetic coil A1 and the electromagnetic coil A2 in the opposing directions. As a result, a U-shaped magnetic field can be generated through "the core 36 around which the electromagnetic coil A1 is wound"-"base part 35"-"the core 36 around which the electromagnetic coil A2 is wound". Then, of the cores 36, around which the electromagnetic coil A1 is wound, a core 36 which is nearer to the rotor core 23 (magnetic pole side) becomes the N pole and the magnetic pole side of a core 36 around which the electromagnetic coil A2 is wound becomes the S pole (depending on the direction of electrical current flow, the core 36 around which the electromagnetic coil A1 is wound becomes the S pole and the core 36 around which the electromagnetic rotor core A2 is wound becomes the N pole). Here, these polarities depend on the direction in which the electromagnetic coil 37 is wound and the direction in which electrical current is flown.

The rotor core 23 is magnetized to have a polarity dependant on the polarity of the opposing cores 36. For example, if the magnetic pole side of the core 36, around which the electromagnetic coil A1 is wound, is the N pole, the rotor core 23 which is opposed to this core 36 is magnetized to be the N pole. If the magnetic pole side of the core 36, around which the electromagnetic coil A2 is wound, is the S pole, the rotor core 23 which is opposed to this core 36 is magnetized to be the S pole.

(2) Second Pattern

In the second pattern, of the plurality of electromagnet coils 37, electrical current is flown to every other electromagnetic coil. Specifically, as shown in FIG. 4 (ii-2), while electrical current is not flown to each of the electromagnetic coils 37 "A2", "A4", "A6", "A8", "A10", "A12", "A14" and "A16" (turn off), electrical current is flown to each of the electromagnetic coils 37 "A1", "A3", "A5", "A7", "A9", "A11", "A13" and "A15" (turn on)

The above-mentioned first pattern is a control pattern which requires a high degree of torque, for example, when the automobile starts to move. In contrast, the second pattern is a control pattern which does not require a high degree of torque, for example, during driving.

If electrical current is flown in the second pattern, the power for magnetizing the rotor core 23 is decreased as compared with the case of the first pattern. However, during driving, as the automobile moves forward with inertia, a high degree of torque is not required.

Here, in the electromagnetic coil 37 through which electrical current is not flown, power is generated based on the principle of a power generator, utilizing the counter electromotive force generation mechanism. The generated electric power is used for charging a battery 82 through a linear power-generating DC stabilizer 83 and a power source control apparatus 81 (see FIG. 12).

(Control of Electromagnetic Coil B)

The electromagnetic coil B (torque-inducing coil B) comprises 16 electromagnetic coils B1 to B16 as shown in FIG. 5(*i*), as in the case of the electromagnetic coil A.

Electrical current is flown to these electromagnetic coils B, as shown in FIG. 5(*ii*), in three patterns. Specifically, electrical current is flown in the first pattern (ii-1), the second pattern (ii-2), the third pattern (ii-3) and the fourth pattern (ii-4).

The electromagnetic coil B, as shown in FIG. 5(*ii*), controls an electromagnet group consisting of four adjacent electromagnets 32, for example. All of the electromagnets are divided into groups "B1, B2, B3, B4", "B5, B6, B7, B8", "B9, B10, B11, B12" and "B13, B14, B15, B16".

(1) First Pattern

For each group, electrical current is flown only to one electromagnetic coil B and not flown to the remaining electromagnetic coils B.

Specifically, as shown in FIG. 5(*ii*-1), electrical current is flown to "B1", "B5", "B9" and "B13". Electrical current is not flown to "B2, B3, B4", "B6, B7, B8", "B10, B11, B12" and "B14, B15, B16".

(2) Second Pattern

For each group, electrical current is flown to two electromagnetic coils B and is not flown to other electromagnetic coils B.

Specifically, as shown in FIG. 5(*ii*-2), electrical current is flown to "B1, B2", "B5, B6", "B9, B10", and "B13, B14". Electrical current is not flown to "B3, B4", "B7, B8", "B11, B12" and "B15, B16".

(3) Third Pattern

For each group, electrical current is flown to three electromagnetic coils B and is not flown to other electromagnetic coils B.

Specifically, as shown in FIG. 5(*ii*-3), electrical current is flown to "B1, B2, B3", "B5, B6, B7", "B9, B10, B11" and "B13, B14, B15"). Electrical current is not flown to "B4", "B8", "B12" and "B16".

(4) Fourth Pattern

This is a pattern in which electrical current is flown to all of the electromagnetic coils B.

As shown in FIG. 5(*ii*-4), electrical current is flown to all of the electromagnetic coils 37 "B1, B2, B3, B4", "B5, B6, B7, B8", "B9, B10, B11, B12" and "B13, B14, B15, B16".

Due to such a control, it is possible to allow a maximum torque to be generated by performing the control in the fourth pattern at the time of starting and realize power saving by performing the control in the first to the third patterns during driving.

When control is performed in the first to the third patterns, in the electromagnetic coils to which electrical current is not flown, electric power is generated based on the principle of a power generator, utilizing a counter electromotive force generating system. The generated power is used for charging a battery 82 through a linear power-generating DC stabilizer 83 and a power source control device 81 (see FIG. 12).

In this embodiment, 16 electromagnetic coils B are divided into four groups. The number of groups is not specifically limited to four. The number of groups may be two, three or five more.

In this embodiment, one group consists of four electromagnetic coils. The number of the electromagnetic coils is not limited to four. The number of electromagnetic coils may be two, three or five or more.

[Structure of the Installation Part]

The structure of the wheel-installation part is explained with reference to FIGS. 6 and 7.

Figure 6:
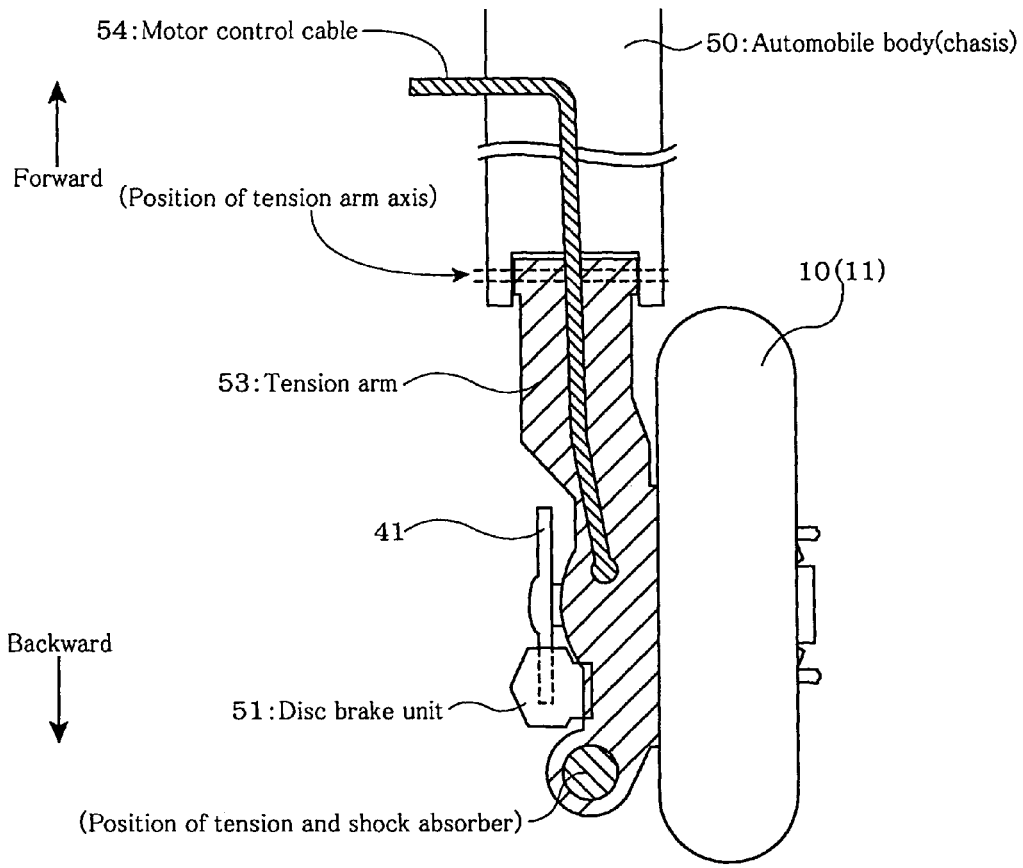
FIG. 6 is a top view showing the structure of a wheel-installing part when the automobile is viewed from the top.

FIG. 6 is a top view showing the structure of the wheel-installation part when the automobile is viewed from the top. FIG. 7 is a front view showing the structure of the wheel-installation part when the automobile is viewed from the side.

Figure 7:
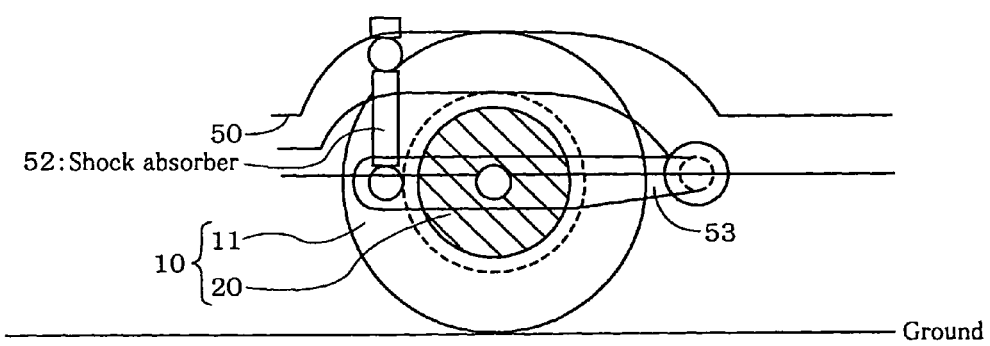
FIG. 7 is a plan view of a structure of the installation part when the automobile is viewed from the side.

As shown in FIGS. 6 and 7, an automobile 1 comprises a disc brake unit 51, a shock absorber 52, a tension arm 53 and a motor control cable 54.

The disc brake unit 51 is a mechanism in which a brake cylinder, a brake lever mechanism, a clearance adjustor, a brake block-installation mechanism (they are not shown) are accommodated in a small space of a single housing.

The shock absorber 52 absorbs the vibration of the automobile body due to the restoring force of a spring (not shown).

The tension arm (tension rod, compression rod) 53, in an auxiliary manner, serves to fasten a lower arm, which is thinner than an upper arm.

The motor control cable 54 is a cable for sending a signal from a linear drive travel system 85 (described later) in order to perform electrical current control for each electromagnet 32 in the linear drive travel system.

Next, a front wheel linear system and a direction-switching mechanism are explained with reference to FIGS. 8 and 9.

Figure 8:
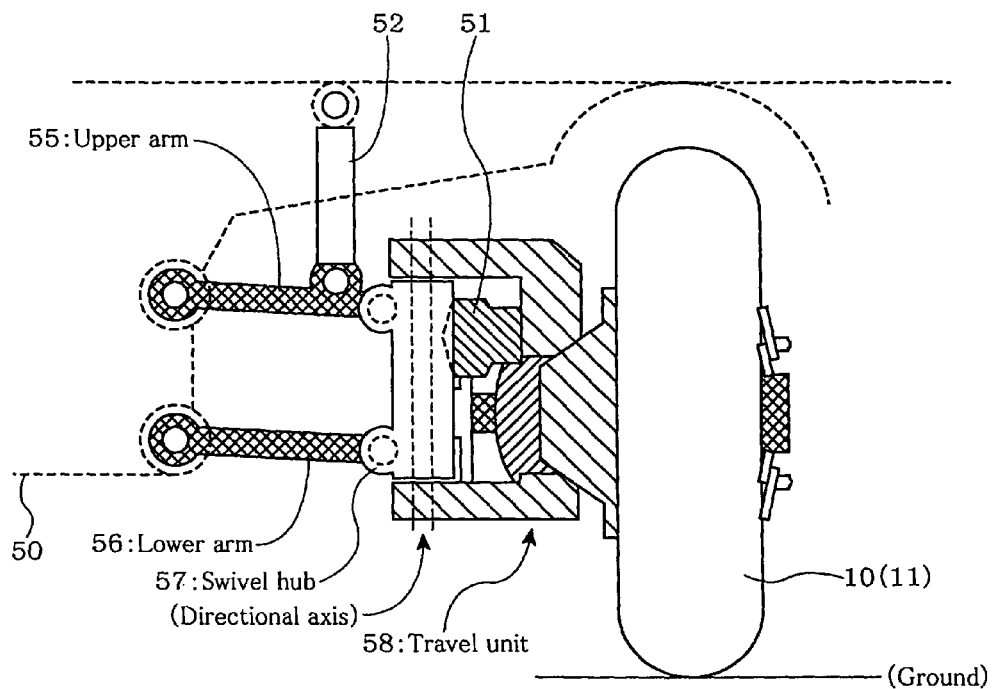
FIG. 8 is a rear side view showing the structure of a direction switching mechanism.
Figure 9:
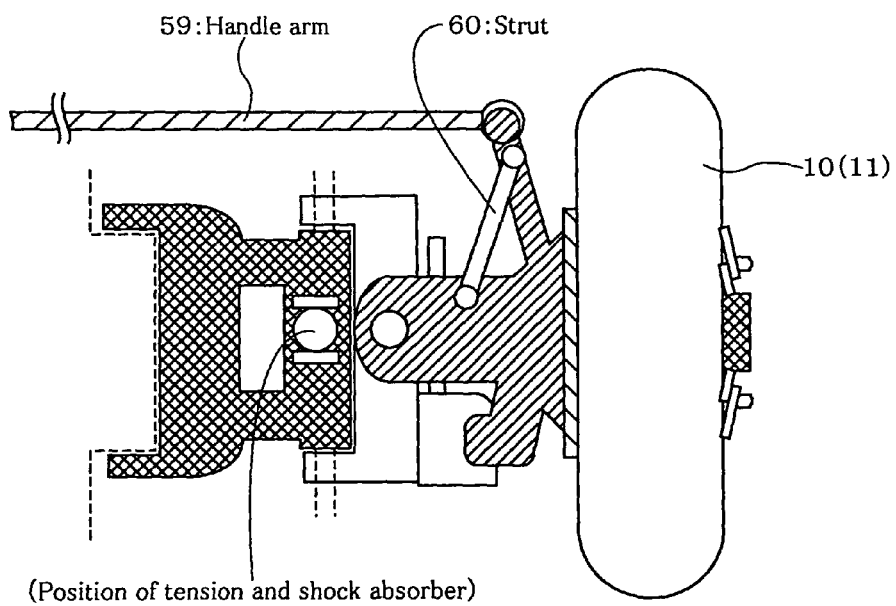
FIG. 9 is a top view showing the structure of a direction switching mechanism.

FIG. 8 is a rear side view showing the structure of the direction-switching mechanism, and FIG. 9 is a top view showing the structure of the direction-switching mechanism.

In the wheel 10, even though a linear system is mounted, the conventional direction-switching mechanism can be utilized.

As shown in FIGS. 8 and 9, the automobile 1, in which the wheel 10 of this embodiment is mounted, comprises an upper arm 55, a lower arm 56, a swivel hub 57, a driving unit 58, a steering wheel 59 and a strut 60.

A crank is composed of the upper arm 55, the lower arm 56, the swivel hub 57, and an automobile body part to which the upper arm 55 and the lower arm 56 are connected.

A shock absorber 52 is connected to the upper side of the upper arm 55. The shock absorber 52 absorbs impact derived from the up-and-down movement of the wheel 10.

The steering wheel arm 59 connects both front wheels. In the middle part thereof, the steering wheel arm 59 is connected with the steering wheel. Due to such a configuration, if the steering wheel is steered to the right, the front wheels are steered to the right, and if the steering wheel is steered to the left, the front wheels are turned left.

Figure 10:
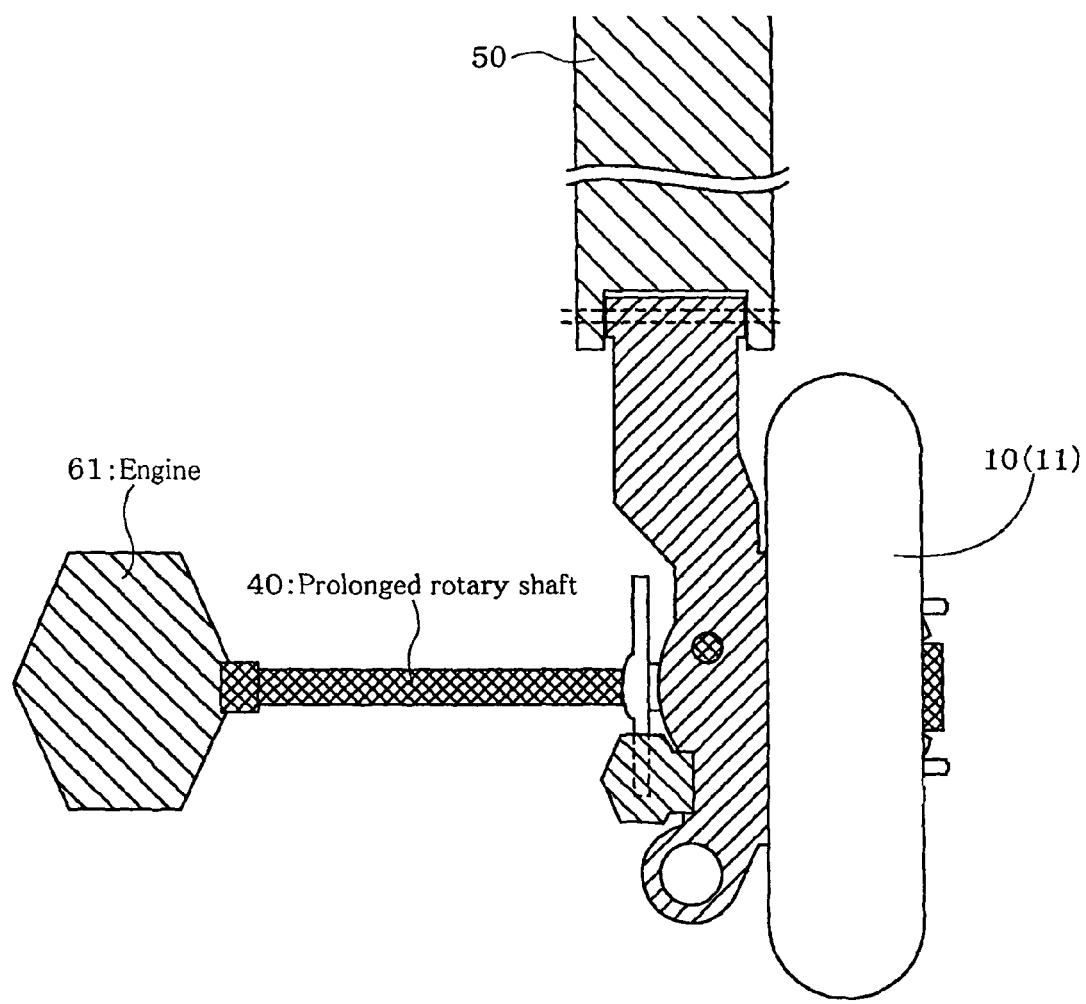
FIG. 10 is a view showing a hybrid automobile obtained by connecting engines by increasing the length of a rotary shaft.

As shown in FIG. 10, by increasing the length of the rotary shaft 40 and connecting the rotary shaft 40 with an engine 61, a hybrid automobile can be realized.

[Other Configurations of the Automobile]

Of the configurations of the automobile of this embodiment, a configuration relating to a control system described later is explained with reference to FIG. 11.

Figure 11:
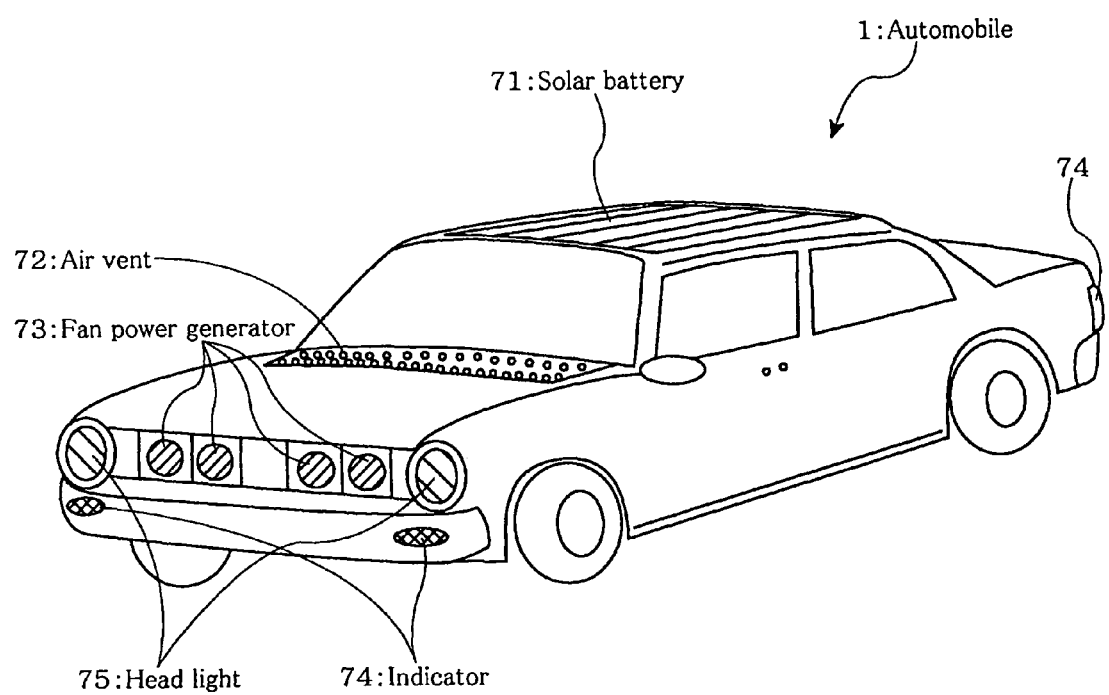
FIG. 11 is a perspective view showing the structure of an entire automobile.

FIG. 11 is a perspective view showing the appearance of the entire automobile.

The automobile 1 comprises a solar battery 71, an air vent 72, a fan power generator 73, an indicator 74 and a head light 75.

As shown in FIG. 11, the solar battery 71 may be provided in the roof of an automobile body (roof part), a bonnet hood, a trunk hood or the like. The solar battery 71 photo-electrically converts light emitted by the sun or the like, and outputs as an electric energy. The converted electric energy is sent to a power source control device 81.

The air vent 72, which is provided below the front glass, is a hole for air intake.

The fan power generator 73 is provided in the front part of the inside of the bonnet, with its fan directed toward the front grill (radiator grill). The fan rotates by the wind force of the outside air (air) taken in through the front grill. Power is generated in the main body of the fan power generator 73 by the rotational force. The generated power is sent to the power source control device 81.

The indicator 74 is attached to the front side or the rear side of the automobile 1. By causing a built-in high-luminous LED to flash, the direction in which the automobile 1 moves is indicated.

A headlight 75 is an illuminator for driving at night. A hybrid of a high-luminance LED and a halogen lamp can be used.

[Control System]

The control system of the linear drive travel system and the automobile of this embodiment is explained with reference to FIG. 12.

Figure 12:
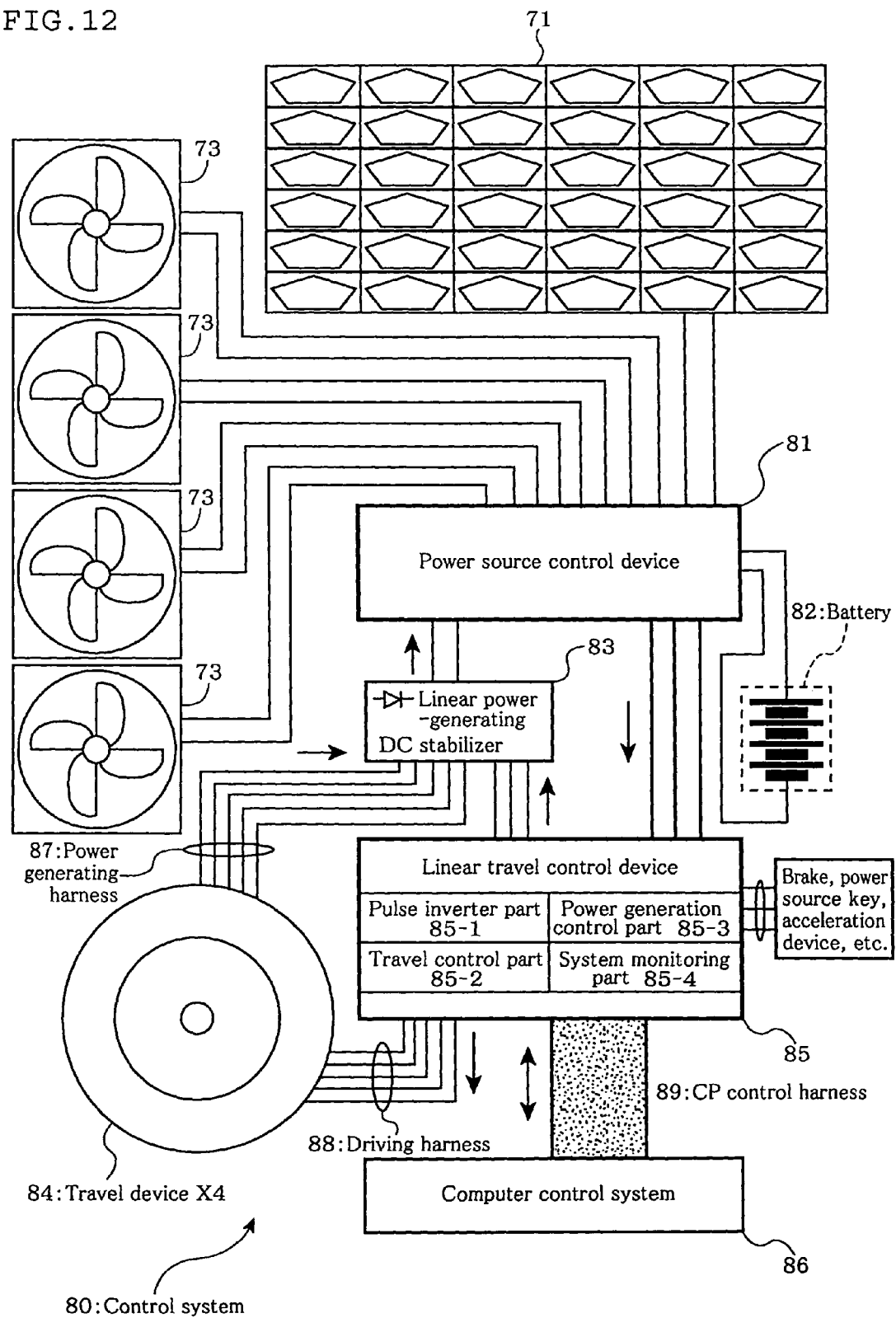
FIG. 12 is a block diagram showing the structure of a control system.

FIG. 12 is a block diagram showing the structure of the control system.

As shown in FIG. 12, the control system (control means) 80 of the linear drive travel system and the automobile comprises a power source control device 81, a battery (main battery) 82, a linear power-generating DC stabilizer 83, a travel device 84, a linear travel control device 85 and a computer control system 86.

When the power control device 81 receives power from each of a solar battery 71, the fan power generator 73, the battery 82 or the liner power-generating DC stabilizer 83, it supplies the received power to the linear travel control device 85. In addition, the power source control device 81 can use the power received from the linear power-generating DC stabilizer 83 (electromagnet 32 of the travel device 84) for charging a battery 82.

In the power source control device 81, to suppress the use of the battery 82 as much as possible, it is possible to supply the power from the solar battery 71, the fan power generator 73 and the linear power-generating DC stabilizer 83 (electromagnet 32 of the travel device 84) to the linear drive control device 85 before the power from the battery 82 is supplied to the linear travel control device 85.

Figure 13:
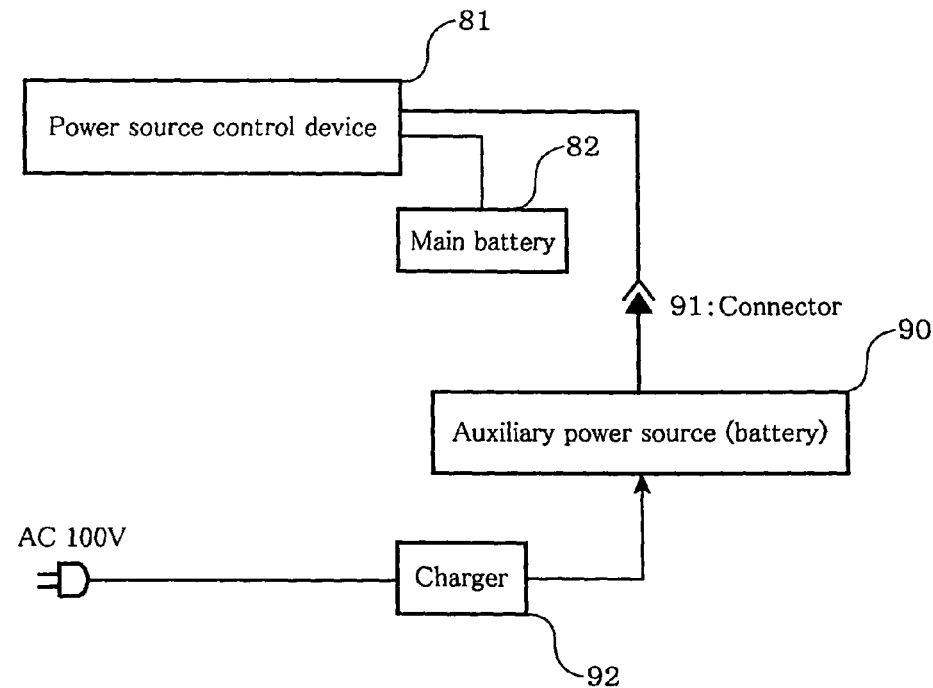
FIG. 13 is a block diagram showing a configuration in which an auxiliary power source is connected to a power source control device.

As shown in FIG. 13, in addition to the power from the main battery 82, the power source control device 81 can receive power from an auxiliary power source (auxiliary battery, spare battery) 90.

The auxiliary power source 90 is connected with the power source control device 81 by a connector 91. That is, the auxiliary power source 90 is detachable from the power source control device 81. Accordingly, for example, when parking for a prolonged period of time, it is possible to remove the auxiliary power source 90 from the power source control device 81, and bring it home for charging by means of a battery charger 92 connected to a domestic power source (AC 100V).

Figure 14:
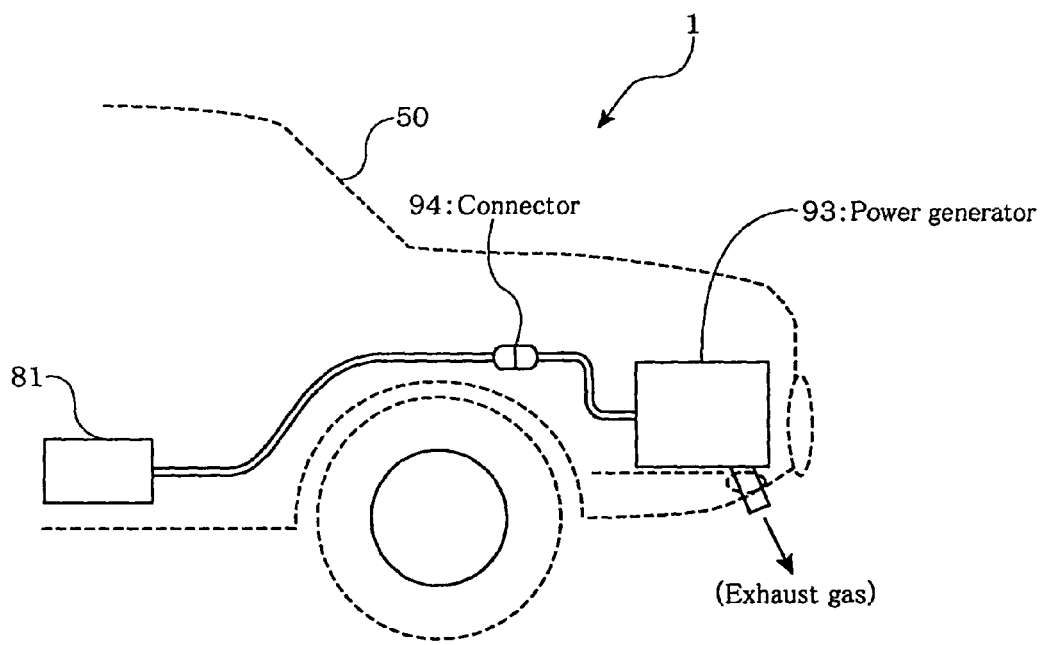
FIG. 14 is a schematic view showing a configuration in which a detachable power generator is connected to a power source control device.

Furthermore, the power generator 93 can be connected to the power source control device 81, as shown in FIG. 14.

The power generator 93 is mounted on the rear trunk of the automobile 1, and is connected with the power source control device 81 by a connector 94. That is, the power generator 93 is detachable from the power control device 81.

This power generator 93 is a small-sized power generator for automatic cell start-up which is used when the voltage of the battery 82 is dropped to 85% during driving.

The exhaust gas of this power generator 93 is discharged outside.

The configuration shown in FIG. 14 is the one for meeting the future demand brought by the technical innovation of the battery.

The linear power-generating DC stabilizer 83 receives power generated by the electromagnets 32 of the travel device 84 through a power-generating harness 87. The received power is then rectified from alternating electrical current to direct electrical current, and sent to the power source control device 81 after stabilization. That is, the linear power-generating DC stabilizer 83 is a device for stable charging, and may be called a monitor control.

The linear power-generating DC stabilizer 83 operates based on remote signals for its operation which are sent from the linear travel control apparatus 85.

The travel device 84 comprises each wheel 10 and the drum rotor (rotor core 23) mounted on each wheel 10 and the stator 30.

The power generated by the electromagnets 32 of the travel system 84 is sent to the linear power-generating DC stabilizer 83 through the power generating harness 87.

The travel device 84 receives, through the driving harness 88, control signals (control electrical current) of the electromagnets 32 from the linear travel control device 85. As a result, the mechanism explained in the above-mentioned "Electrical Current Control of Electromagnet" is realized.

The linear travel control system 85 is a device which serves, together with the computer control system 86, as the center of the control system 80, and comprises a pulse inverter part 85-1, a travel control part 85-2, a power generation control part 85-3 and a system monitor part 85-4.

The pulse inverter part 85-1 receives a control signal corresponding to the operation amount of an acceleration device (not shown), and converts a direct electrical current signal to an alternating electrical current signal (pulse signal).

The travel control part 85-2 generates a driving signal based on the pulse signal generated in the pulse inverter part 85-1, and controls the travel system 84 by sending this driving signal to the travel device 84 through the driving harness 88.

Details of the operation of each of the pulse inverter part 85-1 and the travel control part 85-2 are mentioned in the [Rotational Control], given later.

The power generating part 85-3 controls power generated in the electromagnets 32 of the travel system 84.

The system monitor part 85-4 monitors the entire system of the control system 80 including the linear travel device 85 as the main device.

Figure 15:
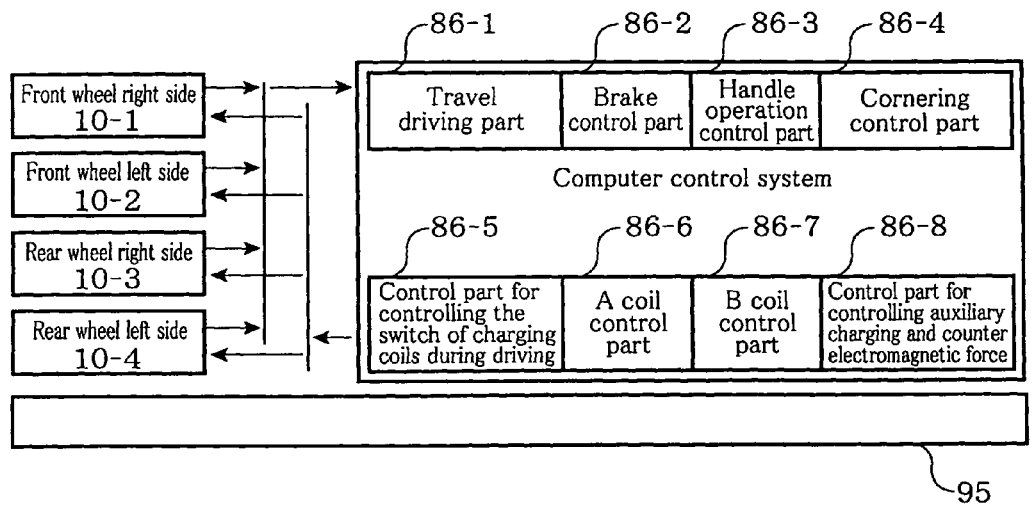
FIG. 15 is a block diagram showing the structure of a computer control system.

The computer control system 86 is a device which serves, together with the linear drive control device 85, as the center of the control system 80, and controls, as shown in FIG. 15, each stator 30 of each wheel 10 (a right front wheel 10-1, a left front wheel 10-2, a right rear wheel 10-3, a left rear wheel 10-4) and comprises a travel drive control part 86-1, a brake control part 86-2, a steering wheel manipulation control part 86-3, a cornering control part 86-4, a control part 86-5 for controlling the switch of charging coils during driving, a control part 86-6 for controlling auxiliary charging and counter electromagnetic force, an A coil control part 86-7 and a B coil control part 86-8.

The travel driving control part 86-1, together with the travel control part 85-2 of the linear travel control device 85, serves to adjust a torque to be applied to a drum rotor by controlling the electrical current flown to each electromagnet 32 of the travel device 84, thereby changing the driving speed.

The brake control part 86-2 sends a control signal to a disc brake unit 51 when the brake pedals (not shown) are stepped on or a hand brake 95 is manipulated, causing a brake disc 41 to be operated to perform brake control of the wheel 10.

The steering wheel manipulation driving part 86-3 performs EHPS (Electro Hydraulic Power Steering), for example. That is, the steering wheel manipulation driving part 86-3 actuates a hydraulic pump by means of an electric motor, controls the hydraulic pressure by the actuated power steering according to the speed of the automobile, and electrically adjusts the weight of the steering wheel to an adequate weight.

The cornering control part 86-4 adjusts the angle of the tire which is based on the rotational angle of a steering wheel (not shown).

In addition, the cornering control part 86-4 performs ESP (Electronic Stability Program), for example. Specifically, it prevents the automobile from moving suddenly off the road or flipping due to the loss of traction of the tires 11 when the driver manipulates the steering wheel suddenly to avoid an obstacle or for other reasons.

Furthermore, the cornering control part 86-4 performs the road surface gripping control via the sensors of the inner and outer wheels according to the number of revolutions of the wheel when the steering wheel is operated in order to change the direction of the four-wheeled linear drive automobile.

Specifically, when the steering wheel is manipulated to the right, the rotation ratio of the left front wheel A and the right front wheel B is changed depending on the radius of the rotation. Therefore, each of the number of revolutions is detected separately for all of the wheels A to D and system control is performed to maintain stabile driving, whereby the settings of the steering wheel angle and the number of revolutions of the wheels A to D are controlled.

For example, when the steering wheel is manipulated to the right, the number of revolutions increases in the order of the wheel A→wheel C (left rear wheel)→wheel D (right rear wheel)→wheel B. The cornering control part 86-4 performs the setting of the number of revolutions.

The control part 86-5 for controlling the switch of charging coils during driving selects electromagnets 32 through which electrical current is flown for the generation of a torque which is necessary for driving, and send instructions to the linear travel control device 85 to allow electrical current to be flown to the electromagnets 32.

The control part 86-6 for controlling auxiliary charging and counter electromagnetic force send instructions to the linear travel control device 85 not to allow electrical current to be flown to the electromagnet 32 for power generation.

The A coil control part 86-7 performs control especially for the A coil, which is performed in the control part 86-5 for controlling the switch of charging coils during driving or the control part 86-6 for controlling auxiliary charging and counter electromagnetic force.

The B coil control part 86-8 performs control especially for the B coil, which is performed in the control part 86-5 for controlling the switch of charging coils during driving or a control part 86-6 for controlling auxiliary charging and counter electromagnetic force.

[Rotational Control]

Next, the rotational control of the wheels is explained with reference to FIGS. 16 and 17.

Figure 17:
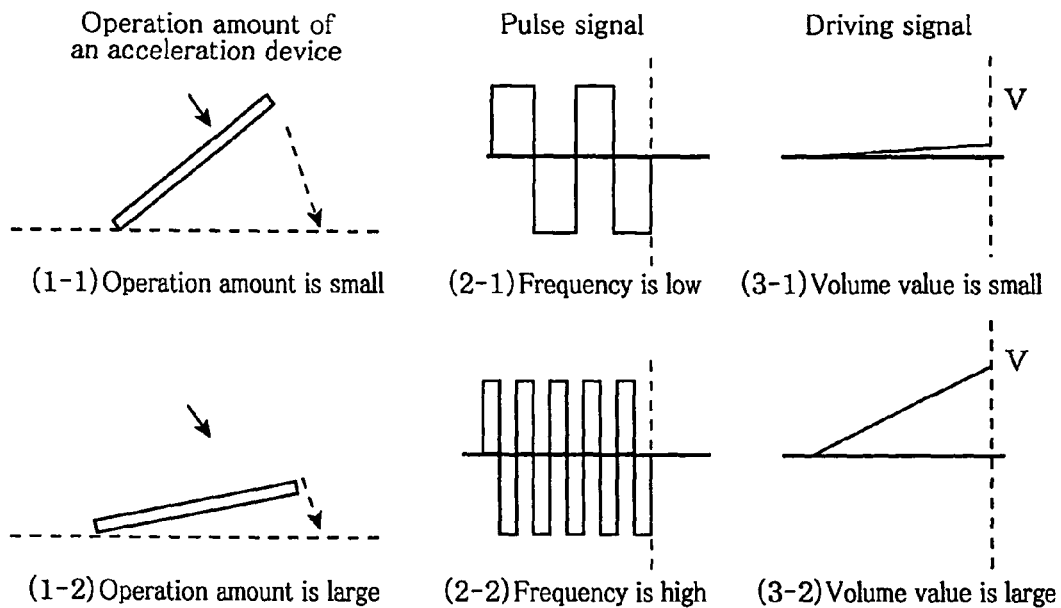
FIG. 17 is an explanatory view showing the relationship between the operation amount of an accelerator device, a pulse signal and a driving signal.

FIG. 16 is a block diagram showing a configuration of a control system relating to the rotational control of the wheel, and FIG. 17 is a view showing the relationship between the operation amount (pedal-depression amount) of an acceleration device, pulse signals and driving signals.

As shown in FIG. 16, the control system for the acceleration control comprises an acceleration device 96, an operation amount-detecting means 97, a pulse generator (pulse inverter part) 85-1, a control voltage comparing means 85-21, control means 85-22 for controlling power supply for switching coils, a driving coil unit (stator of the travel device 84) and a system control means (system monitoring part) 85-4.

The acceleration device 96 is a device to be manipulated by a driver when the automobile 1 is accelerated. Examples of the acceleration device 96 include an acceleration pedal which is provided at the driver's foot and adjusts the amount of acceleration depending on the depth of stepping and a control lever which is provided at the left side of the steering wheel for a physically handicapped person and adjusts the amount of acceleration depending on the amount of pushing (or pulling back).

Of these, as for the acceleration pedal, the operation amount is defined by an amount of depression (depression length, depression angle or the like). In the case of handicapped-adapted vehicle, as for the control lever, the operation amount depends on pushing (or pulling) distance.

The driving amount detecting means 97 detects the amount of operation of the acceleration device 96. This detection can be performed, for example, by using photocouplers or the like. Specifically, a plurality of photocoupler is provided, and these photocouplers are arranged in a single row. This row of photocouplers is provided in the direction of the operation of the acceleration device 96. The acceleration device 96 is provided with a shielding means which shields the photocouplers. As a result, when the acceleration device 96 is operated, light within the plurality of photocouplers is shielded according to the amount of operation. Then, the light outputs a control signal (a change in voltage) according to the number of light-shielded photocouplers (or the number of photocouplers through which light is passed).

The pulse generator 85-1 receives a control signal from the operation amount detecting means 97, and creates and outputs pulse signals corresponding to the voltage value of the control signal.

As shown in FIG. 17, if the operation amount of the acceleration device 96 is small (FIG. 17 (1-1)) and the voltage value of the control signal is small, a pulse signal with a small frequency is created and output (FIG. 17(2-1)).

On the other hand, if the operation amount of the acceleration device 96 is large (FIG. 17(1-2)) and the voltage value of the control signal is large, a pulse signal with a high frequency is created and output (FIG. 17(2-2)).

The control voltage comparing means (driving signal output means) 85-21 creates and outputs a driving signal based on a pulse signal supplied from the pulse generator 85-1.

As shown in FIG. 17, if the frequency of the pulse signal is small (FIG. 17(2-1)), the control voltage comparing means 85-21 creates and outputs a driving signal with a small voltage value (FIG. 17(3-1)).

On the other hand, if the frequency of the pulse signal is large (FIG. 17(2-2)), the control voltage comparing means 85-21 creates and outputs a driving signal with a large voltage value (FIG. 17(3-2)).

The control voltage comparing means 85-21 compares the strength or frequency of a pulse inverter power source. In relationship with the system control means 85-4, charging is performed by the control of the system control means 85-4 when charging by the driving coil unit 84 is possible. A signal for avoiding untimely charging is received from the system control means 85-4 and comparing driving is performed.

The control means 85-22 for controlling power supply for switching coils controls the driving coil unit 84 based on the driving signal sent from the control voltage comparing means 85-21.

The driving coil unit 84 is a coil which produces a magnetic repulsive force for rotating the drum rotor core 23, and includes both the electromagnetic coil A and the electromagnetic coil B in FIG. 3. Here, the coil A serves to produce a magnetic field in the drum rotor and the coil B serves to rotationally drive a drum rotor.

The system control means 85-4 is part of the computer control system shown in FIG. 15, and does not perform analogue control. Control is performed integrally with the computer control system and is not detached therefrom. The system control means 85-4 is positioned in the linear travel control device 85 in FIG. 12 as the part thereof.

[Air Conditioner]

Next, an air conditioner to be mounted in the automobile is explained with reference to FIG. 18.

Figure 18:
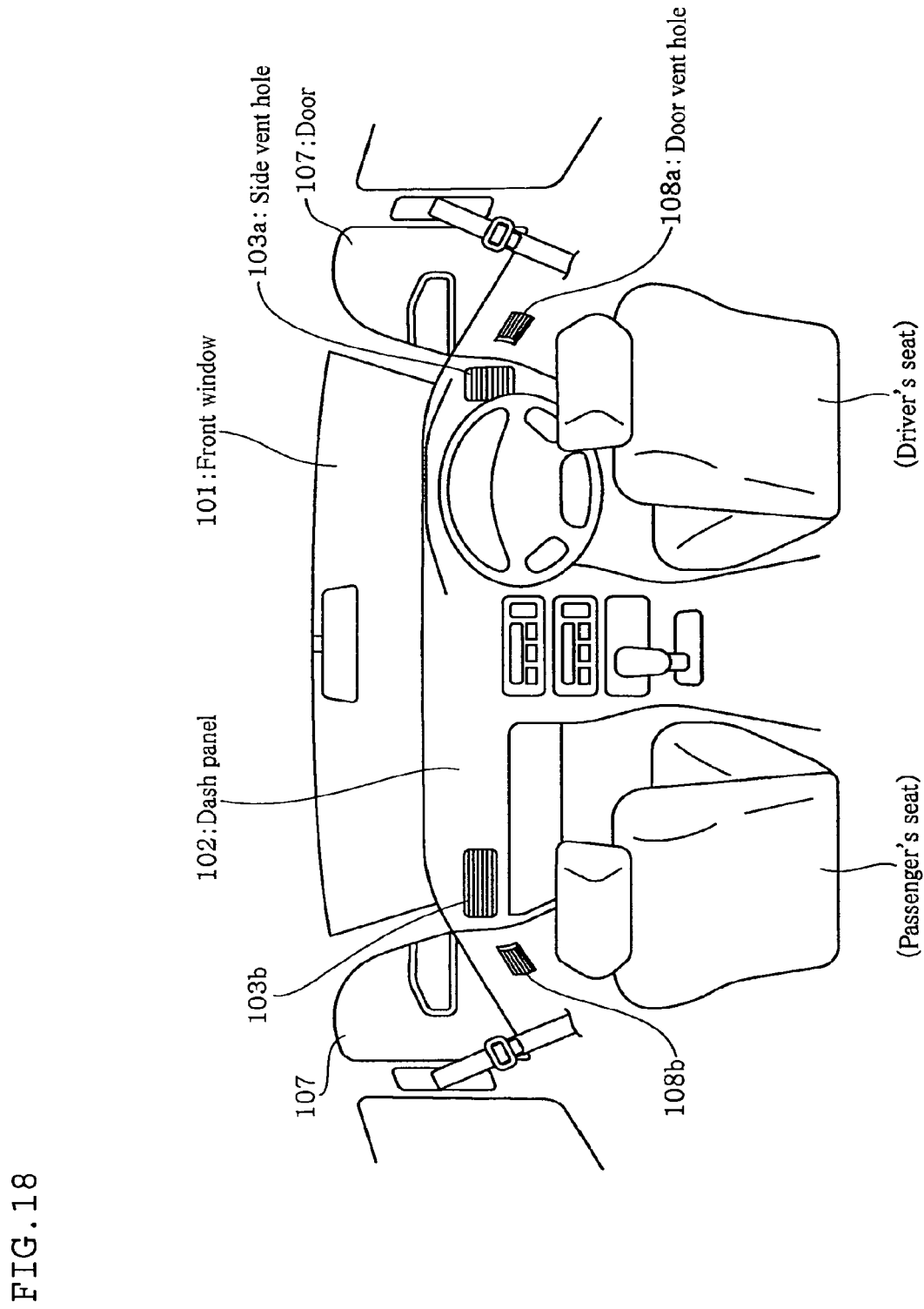
FIG. 18 is a schematic view showing each seat and its peripheral structure of the automobile when the automobile is viewed from the back.

FIG. 18 is a schematic view showing the configuration of each seat and its periphery when the driver's seat and the passenger's seat are viewed from the back.

As shown in FIG. 18, the dash panel 102 under the front window 101 is provided with a side vent hole 103 (103*a*, 103*b*).

The side vent hole 103 (103*a*, 103*b*) is provided inside the automobile in an exposed way, discharging the air, which is taken in from the outside or inside of the automobile, to the inside of the automobile. The side vent hole 103 (103*a*, 103*b*) may be provided in the following manner. For example, as shown in FIG. 18, a side vent hole 103*a* may be provided on the right side of the steering wheel as viewed from the driver's seat and another side vent hole 103*b* may be provided on the left side of the dash panel 102 as viewed from the passenger's seat.

However, the position of the side vent hole 103 (103*a*, 103*b*) is not limited to these positions. For example, one of the side vent hole 103 (103*a*, 103*b*) may be provided on the left side of the steering wheel, above the audio equipment, or on other locations.

A unit dome 104 is provided inside of the side vent hole 103 (103*a*, 103*b*). The structure of the unit dome 104 is shown in FIG. 19.

Figure 19:
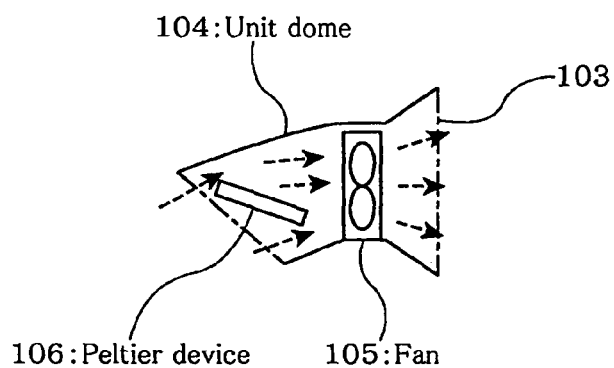
FIG. 19 is a cross-sectional view showing a unit dome to be attached to the dash panel and its internal structure.

As shown in FIG. 19, a fan 105 and a peltier device 106 are provided inside the unit dome 104.

The fan 105 is provided inside the unit dome 104 (in front of the side vent hole 103 (103*a*, 103*b*)), and sends air from the side vent hole 103 (103*a*, 103*b*) to the inside of the automobile 1.

The peltier device 106 heats or cools the air supplied by the fan 105 by using voltage conversion.

The side surface of a door 107 facing the inside the automobile 1 is provided with door vent hole 108 (108*a*, 108*b*).

The door vent hole 108 (108*a*, 108*b*) is provided inside the automobile in an exposed way, and discharges air, which is taken from outside or inside the automobile, to the inside of the automobile.

Inside of the side vent hole 103 (103*a*, 103*b*), the unit dome 104 is provided. The structure of the unit dome 104 is shown in FIG. 20.

Figure 20:
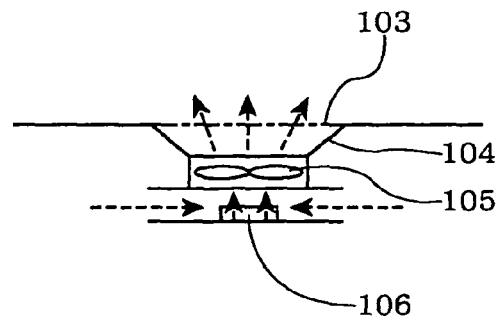
FIG. 20 is a cross-sectional view showing a unit dome to be attached to the door and its internal structure.

As shown in FIG. 20, the unit dome 104 is provided with the fan 105 and the peltier device 106. The fan 105 and the peltier device 106 are provided within the unit dome 104. The fan 105 and the peltier device 106 have the same function as the fan 105 and the peltier device 106 provided inside the side vent hole 103 (103*a*, 103*b*).

By providing an air conditioner with such a configuration in the automobile, it is possible to send heated or cooled air inside the automobile. Furthermore, by providing a peltier device in front of the fan, an air conditioner may be provided in a narrow place such as the inside of the door.

The preferred embodiment of the liner drive travel system and the automobile of the invention is explained hereinabove. The linear drive travel system and the automobile are not limited to those mentioned in the above-mentioned embodiment. It is needless to say that various modifications may be possible within the scope of the invention.

For example, in the above-mentioned embodiment, the linear drive travel system has a configuration in which the rotor core is positioned outside the stator. The position of the rotor core is not limited to the outside the rotor core. A configuration in which the rotor core is positioned inside of the stator may be possible.

In FIG. 3, the coil near the disc is the electromagnetic coil A and the other coil is the electromagnetic coil B. However, the coil near the disc may be the electromagnetic coil B and the other coil may be the electromagnetic coil A.

In FIG. 3, a single row of the electromagnetic coils A and a single row of the electromagnetic coils B are provided. However, the number of row is not limited to one. A plurality of rows of electromagnetic coils may be provided.

INDUSTRIAL APPLICABILITY

Since the invention relates to a linear drive travel system to be mounted on the metal wheel of the wheel, it can be used to any vehicle such as an automobile or a bicycle, which has a metal wheel.

The invention claimed is:

1. A linear drive travel system comprising:
   a metal wheel having a drum rotor and a stator arranged inside the metal wheel, wherein the metal wheel has a rotary shaft as an axis of rotation of the metal wheel,
   the stator has
   a plurality of rows of electromagnets arranged in the direction of the axis of rotation, each row being formed by a plurality of the electromagnets arranged around the circumference of the rotary shaft,
   a stator base having the electromagnets attached to an outer periphery thereof and a through hole for passing the rotary shaft therethrough,
   a plurality of bearings engaged in the through hole of the stator base and a plurality of bearings having an inner ring through which the rotary shaft passes, and
   a rotary sensor provided between two bearings of the plurality of bearings,
   the drum rotor has a plurality of arc-shaped rotor rotary cores arranged along the circumference of the rotary shaft, and
   a slit is provided between the rotor rotary cores.

2. The linear drive travel system according to claim 1, further comprising a control unit which controls electric current to be flowed to the electromagnets, wherein the control unit controls the electromagnets in some rows as a magnetization coil, and controls the electromagnets in one or two or more other rows as a rotation coil of the drum rotor.

3. The linear drive travel system according to claim 2, wherein, for the electromagnets in one row to be controlled as the magnetization coil, the control unit performs the following control in a switching manner,
   flowing electrical current to adjacent electromagnets in opposing directions to generate a U-shaped magnetic field to allow one electromagnet to be the N pole and the other electromagnet to be the S pole; and
   flowing electrical current to every other electromagnet of the plurality of electromagnets.

4. The linear drive travel system according to claim 2, wherein, for a plurality of electromagnets in one row to be controlled as the rotation coil, the control unit performs the following control in a switching manner with the plurality of electromagnets being divided into a plurality of groups, for each group, flowing electrical current to one electromagnet and not flowing the electrical current to other electromagnets, for each group, flowing electrical current to a plurality of electromagnets and not flowing the electrical current to other electromagnets, and flowing electrical current to all of the electromagnets.

5. The linear drive travel system according to claim 2, further comprising an acceleration device to be operated by a driver, an operation amount detecting unit which detects an operation amount of the acceleration device, a pulse generator which creates and generates a pulse signal having a frequency corresponding to the operation amount upon receipt of a detection signal from the operation amount detecting unit, and a driving signal outputting unit which creates and outputs a signal for driving the electromagnets as the magnetization coil and the electromagnets as the rotation coil based on the pulse signal from the pulse generator, wherein the control unit controls electrical current to be flowed to the electromagnets as the magnetization coil and the electromagnets as the rotation coil based on the driving signal.

6. An automobile, comprising:

a plurality of wheels, wherein the linear drive travel system according to claim 1 is mounted on one or two or more of the wheels of the automobile.

\* \* \* \* \*